O. W. G. HOLMGREN.
LOCKING MEANS FOR MOTOR VEHICLE STEERING GEAR.
APPLICATION FILED JUNE 9, 1917.
1,249,755.
Patented Dec. 11, 1917.
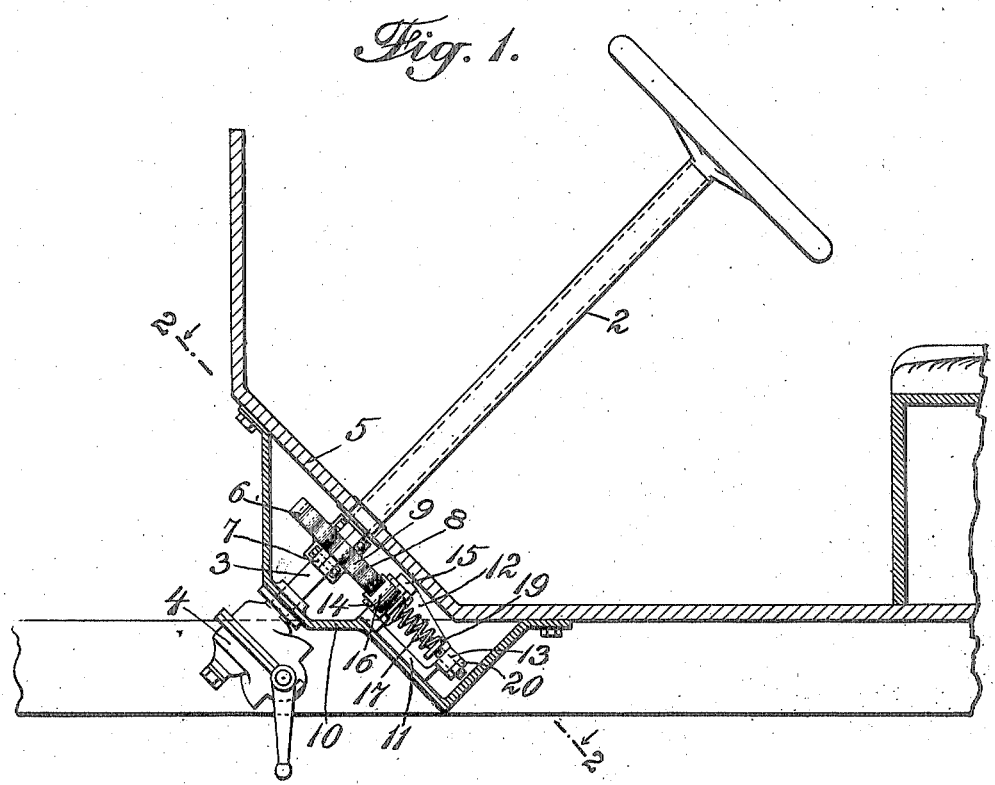
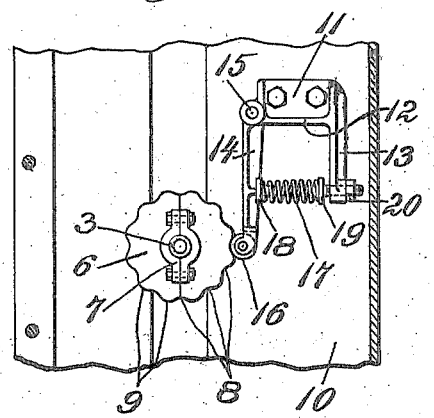
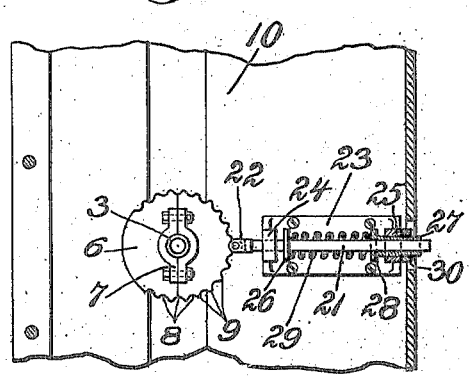
INVENTOR
O.W.G. Holmgren
BY
ATTORNEY

UNITED STATES PATENT OFFICE.

OTTO WILLIAM G. HOLMGREN, OF NEW YORK, N. Y.

LOCKING MEANS FOR MOTOR-VEHICLE STEERING-GEAR.

1,249,755.  Specification of Letters Patent.  Patented Dec. 11, 1917.

Application filed June 9, 1917. Serial No. 173,863.

*To all whom it may concern:*

Be it known that I, OTTO WILLIAM G. HOLMGREN, a citizen of the United States, residing at Jamaica, New York city, in the county of Queens and State of New York, have invented a certain new and useful Improvement in Locking Means for Motor-Vehicle Steering-Gear, of which the following is a specification.

My invention relates to steering gear for motor vehicles, and has to do particularly with means for facilitating the operation of such steering gear by providing a constantly operable resilient locking arrangement therefor which will afford maximum immunity from the transmission of driving strains from the steering wheel to the hands of the operator.

Previously designed constructions of this nature have contemplated the rigid locking of the steering-gear in its various positions, such apparatus, however, possessing the defect that the steering gear is subject to injury whenever the guided wheels of the vehicle engage an obstruction with any degree of violence. Other constructions have essayed the intermittent locking of the steering gear in position by independently operated means, this type, however, in order to operate efficiently, practically requiring attention equal to that given the operation of the vehicle itself.

The object of my invention is to provide a steering gear locking arrangement adaptable to all types of motor vehicles whereby the driving wheel strains may be absorbed and the vehicle easily and smoothly guided, it even being possible for the operator to remove his hands from the steering wheel on emergent occasions with a greater measure of safety than is otherwise possible.

Another object is to obviate the defects of prior constructions, mentioned, by providing a steering gear locking means which will be positive in its action and continuously operable to automatically lock the steering gear in various adjusted positions without requiring the slightest attention on the part of the operator, but which will, however, be possessed of sufficient resiliency to yield under extraordinary stresses.

Further objects are to provide a device of this character which will be low in cost of production, simple in construction and easy of attachment to any motor vehicle steering gear; which will be durable and efficient in operation, presenting the minimum of liability to disorder; and which, by reason of its advantages, will contribute toward the lengthening of the life of the wheel tires and other parts of the vehicle.

With the above and other objects in view I have devised the steering gear locking device, practical embodiments of which are shown in the accompanying drawing, forming a part of this specification, in which—

Figure 1 shows a side elevation, partly in section, of a portion of a motor vehicle showing the steering column and shaft with my improved locking device applied thereto;

Fig. 2, a plan view, taken on the line 2—2 of Fig. 1, looking in the direction of the arrows, showing the locking device in operative position; and Fig. 3, a view similar to Fig. 2, partly in section, of a modified form of my invention.

In the drawing, referring first to Figs. 1 and 2, is shown a portion of the main frame or chassis 1 of a motor vehicle provided with the usual steering wheel and column 2. The column 2 houses the steering wheel shaft 3, to which the steering wheel is secured, and this shaft 3 connects with the usual guiding wheel operating levers (not shown), the connections thereto being housed in the gear casing 4. I have shown my improved arrangement as being attached to the shaft 3 at a point just below the footboard 5 of the vehicle. Secured to the steering shaft 3, and adapted to rotate therewith, is a circular disk or cam wheel 6, this cam wheel being shown as of two parts, for convenience of attachment to the shaft 3, and being journaled to the shaft by means of the collared portions 7 projecting centrally therefrom, which collared portions are bolted or otherwise secured together in a manner to prevent rotation of the cam wheel on the shaft 3. The periphery of the cam wheel 6 is provided with a series of depressions or recesses 8 and projecting portions 9, these projecting portions 9 forming small cams for a purpose to be hereinafter described.

Attached to the chassis 1 in any desired manner is a base plate or bracket portion 10. On this base plate 10 is fastened the part of my construction which coöperates with the cam wheel 6. This comprises a plate 11, having a flanged portion 12 uprising therefrom and, at one end, a depending arm portion 13. A pivotally secured arm 14 is attached at the pivot point 15 between the ends of the plate 11 and flanged portion 12. At its lower forked end the pivoted arm 14 carries a roller 16, which roller is arranged to ride over the projecting portions 9 and find lodgment in the recesses 8 of the cam wheel as the shaft is rotated. A compressible spring 17 of considerable tension is utilized to maintain the roller 16 on the swinging arm 14 in close locking engagement with the depressions in the cam wheel 6. This spring 17, as will be seen, rests on a pin seat 18 on the arm 14, a seat of similar form being provided on the head of a screw 19 threaded in the free end of the arm 13. Adjustment of the screw 19 tends to regulate the compression of the spring 17, and a nut 20 on the portion of the screw 17 projecting beyond the arm 13, which nut may be of locking construction, serves to maintain the adjustment of the regulating screw 19.

The intention of the construction so far described will be readily apparent. As the steering shaft 3, and hence the cam wheel 6, are rotated, the roller 16 will traverse the periphery of the cam wheel 6, the degree of curvature of the projections being calculated to permit the roller to ride comparatively easily thereover. When the steering wheel and shaft are brought to rest the roller 16 will find lodgment in one of the depressions 8 of the cam wheel 6. The engagement of the roller with the cam wheel constitutes no impediment to the free movement of the steering wheel and shaft, but is sufficiently powerful to lock the steering shaft in the position assumed against displacement through any ordinary unevenness in the path of the vehicle tending to throw the guided wheels out of alinement and causing vibration of the steering wheel. However, by reason of the resiliency of the retaining means, the locking roller will yield should one of the guided wheels accidentally strike some considerable obstruction, such as a street curb, thereby preventing the disarrangement of or serious injury to the steering gear. The positions of the depressions in the cam wheel permit of the locking of the steering shaft through a wide range of adjustment, this being of particular advantage when the device is used with motor vehicles which are required to travel in paths which deviate from a straight-ahead direction to a greater or lesser degree.

The modified form illustrated by Fig. 3 operates in all essential respects similarly to that hereinbefore described, the departure therefrom consisting in the provision of a spring pressed plunger or lever 21 which reciprocates as the cam wheel 6 is rotated by the operation of the driving wheel, in place of the pivoted arm 14. This plunger 21 carries a roller 22 which is held in operative relationship with the cam wheel as follows. A plate 23, having ears 24 and 25 uprising from its ends, is secured to the base plate 10, and these ears are centrally bored to receive the plunger 21. The plunger 21 is provided with a flange portion 26 at a point adjacent to its forward end, and a hollow screw 27, forming a bearing and guide for the other end of the plunger, is threaded in the ear 25. This screw 27 has a flanged head 28 which coöperates with the flange 26 to maintain under compression a spring 29, which surrounds the plunger 21 between these flanges to hold the roller 22 in engagement with the cam wheel 6. The compression of the spring 29 is regulated by adjustment of the screw 27, as in the other modification, and a locking nut 30 locks the screw to maintain the adjustment. As shown in this figure, the base plate 10 may be cut away or apertured to allow extension of the plunger 21 therethrough. In this form I have shown the cam wheel 6 as being provided with the recesses and projections upon only a portion of its periphery, this form being adaptable to steering rods which do not make a complete revolution in operation.

While my invention is here shown in connection with a motor vehicle steering gear it is adaptable to any other form of steering gear where a locking means of the character described is desirable, and it is to be understood that the present showing and description disclose only certain specific embodiments of my invention, and that other forms and modifications are included within the spirit and scope thereof, as expressed in the appended claims.

What I claim is:

1. In a motor vehicle steering gear, the combination with the steering shaft of a circular cam rigidly secured thereto, and means continuously engaging said cam to successively lock the steering shaft against unintentional movement in various adjusted positions.

2. A motor vehicle steering gear comprising, in combination, a steering shaft, a cam wheel secured to and rotating therewith, said cam wheel being provided with peripheral recesses, and a member adapted to successively find lodgment in said recesses as the shaft is rotated to lock the steering shaft in various adjusted positions.

3. In a motor vehicle steering gear, in combination, a steering shaft, a cam wheel secured to and rotating with said shaft, the said cam wheel being provided with recesses along its peripheral edge, a member secured adjacent to said cam wheel arranged to successively find lodgment in said recesses, and means for continuously maintaining said member in engagement with said cam wheel to lock the steering shaft against unintentional movement.

4. A motor vehicle steering gear comprising, in combination, a steering shaft, a cam wheel secured to and rotating with said shaft, the said cam wheel being provided with recesses along its peripheral edge, a member secured adjacent to said cam wheel carrying a roller, and spring pressed means arranged to maintain said roller in engagement with one of said depressions to lock the steering shaft against unintentional movement.

5. A motor vehicle steering gear comprising, in combination, a steering shaft, a circular cam secured thereto, a roller carrying member supported adjacent to said shaft, spring pressed means for maintaining said roller in engagement with said cam, and means for regulating the compression of said spring pressed means.

6. In a motor vehicle steering gear, the combination with the steering shaft of a circular cam secured thereto and adapted to rotate therewith, said cam having peripheral recesses and projections, a plate mounted adjacent to said cam, said plate supporting a roller carrying member, spring pressed means for maintaining said roller carrying member in engagement with said cam, and means for regulating the tension of said spring pressed means.

7. In a motor vehicle steering gear, the combination with the steering shaft of a two-part circular cam, said cam being provided with a series of depressions and projections along its peripheral edge, a plate mounted adjacent to said cam, said plate supporting a roller carrying member, spring pressed means for maintaining said roller in engagement with the peripheral depressions of said cam and means for regulating the tension of said spring pressed means.

8. A motor vehicle steering gear comprising in combination, a steering shaft, a peripherally recessed member secured thereto and rotating therewith, and a pivoted arm continuously engaging said member to lock the steering shaft against unintentional movement.

9. A motor vehicle steering gear, comprising, in combination, a steering shaft, a peripherally recessed member secured thereto and rotating therewith, and a spring pressed pivoted arm continuously engaging said member to lock the steering shaft against unintentional movement.

10. A motor vehicle steering gear, comprising, in combination, a steering shaft, a peripherally recessed member secured thereto and rotating therewith, a plate mounted adjacent to said member, said plate supporting a pivoted arm, and spring pressed means for maintaining said arm in engagement with said member.

11. A motor vehicle steering gear comprising, in combination, a steering shaft, a peripherally recessed member secured thereto and rotating therewith, an arm pivoted adjacent to said member, spring pressed means for maintaining said pivoted arm in engagement with said member, and means for regulating the tension of said spring pressed means.

12. A motor vehicle steering gear comprising, in combination, a steering shaft, a peripherally recessed member secured thereto and rotating therewith, a roller carrying arm pivoted adjacent to said member, spring pressed means for maintaining said arm in engagement with said member, and means for regulating the tension of said spring pressed means.

13. A motor vehicle steering gear comprising, in combination, a steering shaft, a peripherally recessed member secured thereto and rotating therewith, and a plate mounted adjacent to said member, said plate supporting a spring pressed locking member continuously engaging the periphery of said first named member to lock the steering shaft against unintentional movement.

14. A motor vehicle steering gear comprising, in combination, a steering shaft, a peripherally recessed member secured thereto and rotating therewith and a spring pressed locking member engaging said first named member to lock the steering shaft against unintentional movement.

15. A motor vehicle steering gear comprising, in combination, a steering shaft, a peripherally recessed member secured thereto and rotating therewith, and a locking member continuously engaging said peripherally recessed member to lock the shaft in various adjusted positions.

In testimony whereof, I have hereunto set my hand.

OTTO WILLIAM G. HOLMGREN.